（12）United States Patent
Zelenkov (10) Patent No.: US 10,073,832 B2
(45) Date of Patent: Sep. 11, 2018

(54) METHOD AND SYSTEM FOR TRANSCRIPTION OF A LEXICAL UNIT FROM A FIRST ALPHABET INTO A SECOND ALPHABET

(71) Applicant: YANDEX EUROPE AG, Lucerne (CH)

(72) Inventor: Yury Grigorievich Zelenkov, Orekhovo-Zuevo (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/542,255

(22) PCT Filed: Feb. 2, 2016

(86) PCT No.: PCT/IB2016/050524
§ 371 (c)(1),
(2) Date: Jul. 7, 2017

(87) PCT Pub. No.: WO2017/001940
PCT Pub. Date: Jan. 5, 2017

(65) Prior Publication Data
US 2017/0357634 A1 Dec. 14, 2017

(30) Foreign Application Priority Data
Jun. 30, 2015 (RU) .................... 2015125963

(51) Int. Cl.
*G06F 17/27* (2006.01)
*G06F 17/28* (2006.01)
(Continued)

(52) U.S. Cl.
CPC .......... *G06F 17/277* (2013.01); *G06F 17/273* (2013.01); *G06F 17/2863* (2013.01); *G06F 17/2217* (2013.01); *G10L 15/142* (2013.01)

(58) Field of Classification Search
CPC ... G06F 17/2863; G06F 17/273; G10L 13/08; G10L 15/142; G10L 15/183; G10L 25/15
(Continued)

(56) References Cited

U.S. PATENT DOCUMENTS 4,262,431 A * 4/1981 Darnell .................. G09B 17/00
434/170
4,443,199 A * 4/1984 Sakai ..................... G09B 19/08
434/170

(Continued)

FOREIGN PATENT DOCUMENTS

WO 2007068123 A1 6/2007

OTHER PUBLICATIONS

International Search Report with regard to PCT/IB2016/050524 dated May 26, 2016.
(Continued)

*Primary Examiner* — Vijay B Chawan
(74) *Attorney, Agent, or Firm* — BCF LLP (57) ABSTRACT

A server and a method for transcription of a lexical unit from a first alphabet into a second alphabet, the method comprising: acquiring a pair of (i) the lexical unit written in the first alphabet, and (ii) the corresponding transcription of the lexical unit written in the second alphabet, both having been divided into respective segments, such that within the pair, every segment of the lexical unit has a corresponding segment in the transcription of the lexical unit, and such that each lexical unit comprises either a sequence of sequentially alternating consonant segments, or a single vowel segment, or a single consonant segment; defining, for each given segment of the lexical unit, its context; training the server to calculate a theoretical frequency of at least one second
(Continued)

alphabet character representing transcription of a particular given segment based on the context of particular given segment of the lexical unit.

18 Claims, 3 Drawing Sheets (51) Int. Cl.
G06F 17/22 (2006.01)
G10L 15/14 (2006.01)

(58) Field of Classification Search
USPC ........ 704/1, 255, 251, 260, 266, 9; 715/210, 715/234, 250, 258, 264
See application file for complete search history.

(56) References Cited

U.S. PATENT DOCUMENTS

| | | | | |
|---|---|---|---|---|
| 4,484,305 | A | * | 11/1984 | Ho .................. G06F 17/2863 400/110 |
| 5,640,587 | A | | 6/1997 | Davis et al. |
| 5,680,510 | A | * | 10/1997 | Hon .................. G10L 15/142 704/255 |
| 5,742,838 | A | * | 4/1998 | Lim .................. G06F 17/2863 704/1 |
| 5,757,964 | A | * | 5/1998 | Lee .................. G06K 9/6255 382/198 |
| 6,088,666 | A | | 7/2000 | Chang et al. |
| 6,094,633 | A | * | 7/2000 | Gaved .................. G10L 13/08 704/260 |
| 6,108,627 | A | | 8/2000 | Sabourin |
| 6,363,342 | B2 | | 3/2002 | Shaw et al. |
| 7,010,487 | B1 | | 3/2006 | Choi et al. |
| 7,249,013 | B2 | | 7/2007 | Al-Onaizan et al. |
| 7,853,444 | B2 | | 12/2010 | Wang et al. |
| 8,275,600 | B2 | | 9/2012 | Bilac et al. |
| 8,554,537 | B2 | | 10/2013 | Piyush et al. |
| 8,731,901 | B2 | | 5/2014 | Srihari et al. |
| 8,812,300 | B2 | | 8/2014 | Gillam et al. |
| 2006/0129380 | A1 | * | 6/2006 | El-Shishiny .......... G06F 17/273 704/9 |
| 2006/0143207 | A1 | | 6/2006 | McQuaid et al. |
| 2007/0011132 | A1 | | 1/2007 | Zhou et al. |
| 2007/0124133 | A1 | | 5/2007 | Wang et al. |
| 2007/0233460 | A1 | | 10/2007 | Lancaster et al. |
| 2008/0221866 | A1 | | 9/2008 | Katragadda et al. |
| 2008/0270111 | A1 | | 10/2008 | Hanumanthappa |
| 2011/0275037 | A1 | | 11/2011 | Alghamdi |
| 2012/0150530 | A1 | * | 6/2012 | Iida .................. G06F 17/289 704/2 |
| 2013/0246042 | A1 | | 9/2013 | Hagiwara |
| 2014/0095143 | A1 | | 4/2014 | Jan et al. |
| 2014/0163952 | A1 | | 6/2014 | Brawer et al. |

OTHER PUBLICATIONS

International Preliminary Report on Patentability with regard to PCT/IB2016/050524 dated Apr. 20, 2017.

Haffner et al., "Integrating Time Alignment and Neural Networks for High Performance Continuous Speech Recognition", ICASSP-91, IEEE 1991 International Conference on Acoustics, Speech, and Signal Processing, Publication [online], 1991 [retrieved May 6, 2015], pp. 105-108.

Logacheva et al., "Transliteration rules generation and named entities transliteration conducted by a finite-state machine", Moscow, 2012, Electronic Library, http://library.keldysh.ru/preprint.asp?id=2012-14, pp. 1-24.

* cited by examiner

METHOD AND SYSTEM FOR TRANSCRIPTION OF A LEXICAL UNIT FROM A FIRST ALPHABET INTO A SECOND ALPHABET

CROSS-REFERENCE

The present application claims priority to Russian Patent Application No 2015125963, filed Jun. 30, 2015, entitled "METHOD AND SYSTEM FOR TRANSCRIPTION OF A LEXICAL UNIT FROM A FIRST ALPHABET INTO A SECOND ALPHABET" the entirety of which is incorporated herein.

FIELD OF THE TECHNOLOGY

The present technology relates to method and system for transcription of a lexical unit from a first alphabet into a second alphabet.

BACKGROUND

There exist many writing systems in the world. A writing system is any conventional method of visually representing verbal communication. While both writing and speech are useful in conveying messages, writing differs in being a reliable form of information storage and transfer. The processes of encoding and decoding writing systems involve shared understanding between writers and readers of the meaning behind the sets of characters that make up a script.

The general attributes of writing systems can be placed into broad categories such as alphabets, syllabaries, or logographies. Any particular system can have attributes of more than one category. In the alphabetic category, there is a standard set of letters (basic written symbols or graphemes) of consonants and vowels that encode based on the general principle that the letters (or letter pair/groups) represent speech sounds. In a syllabary, each symbol correlates to a syllable or mora. In a logography, each character represents a word, morpheme, or other semantic units. Other categories include abjads, which differ from alphabets in that vowels are not indicated, and abugidas or alphasyllabaries, with each character representing a consonant-vowel pairing. Alphabets typically use a set of 20-to-35 symbols to fully express a language, whereas syllabaries can have 80-to-100, and logographies can have several hundreds of symbols.

Writing is usually recorded onto a durable medium, such as paper or electronic storage, although non-durable methods may also be used, such as writing on a computer display, in sand, or by skywriting.

In computer technologies, there are many services provided to users in many languages. In many instances, service providers translate user interfaces into many languages such that users can read signs and other indications in their own language, or in a foreign language they know. However, sometimes there is a need in transcription, and not in a translation.

Each language has many rules and many exceptions from rules. As a result, generating transcriptions of a high quality can be a challenge. Therefore, there is a need for improving transcription technologies.

SUMMARY

It is thus an object of the present technology to ameliorate at least some of the inconveniences present in the prior art.

In one aspect, implementations of the present technology provide a method for transcription of a lexical unit from a first alphabet into a second alphabet, the method executable at a server. The method comprises: (i) acquiring a pair of (i) the lexical unit written in the first alphabet, and (ii) the corresponding transcription of the lexical unit written in the second alphabet, the lexical unit and the transcription of the corresponding lexical unit having been divided into respective segments, such that within the pair, every segment of the lexical unit has a corresponding segment in the transcription of the lexical unit, and such that each lexical unit comprises one, selected from: (i) a sequence of sequentially alternating vowel segment and consonant segment, (ii) a single vowel segment, (iii) a single consonant segment; each vowel segment consisting of at least one vowel and each consonant segment consisting of at least one consonant; and (ii) defining, for each given segment of the lexical unit, its context; (iii) training the server to calculate a theoretical frequency of at least one second alphabet character representing transcription of a particular given segment based on the context of said particular given segment of the lexical unit.

In some implementations, the lexical unit is one selected from: a word and a phrase.

In some implementations, the lexical unit comprises at least one special character.

In some implementations, at least one special character in the phrase, located between a consonant and a vowel, before the vowel, is deemed to be one, selected from: a vowel and a consonant, and said at least one special character, if being deemed vowel, makes a part of an adjacent vowel segment, and said at least one special character, if being deemed consonant, makes a part of an adjacent consonant segment.

In some implementations, at least one special character in the phrase, located between a vowel and a consonant, before the consonant, is deemed to be one, selected from: a vowel and a consonant, and said at least one special character, if being deemed vowel, makes a part of an adjacent vowel segment, and said at least one special character, if being deemed consonant, makes a part of an adjacent consonant segment.

In some implementations, at least one special character is deemed to be non-existent.

In some implementations, at least one special character is any one, selected from: a space, a hyphen, a line break, page break, and an apostrophe.

In some implementations, the context of the lexical unit comprises one selected from: a preceding context and a following context.

In some implementations, the preceding context of the given segment is any one, selected from: a preceding adjacent segment of the lexical unit and a preceding end of the lexical unit; and following context of the given segment is any one, selected from: a following adjacent segment of the lexical unit and a following end of the lexical unit.

In some implementations, at least one segment of the lexical unit is an aphthong, and the corresponding transcription of the lexical unit comprises a character designated to represent the aphthong.

In some implementations, the second alphabet comprises one, selected from: (i) an alphabet other than the first alphabet, and (ii) a phonetic alphabet.

In some implementations, the method further comprises repeating:
acquiring a pair of (i) the lexical unit written in the first alphabet, and (ii) the corresponding transcription of the lexical unit written in the second alphabet, the lexical unit and the transcription of the corresponding lexical unit having been divided into respective segments, such that within the pair, every segment of the lexical unit has a corresponding segment in the transcription of the lexical unit, and such that each lexical unit comprises one, selected from: (i) a sequence of sequentially alternating vowel segment and consonant segment, (ii) a single vowel segment, (iii) a single consonant segment; each vowel segment consisting of at least one vowel and each consonant segment consisting of at least one consonant; and defining, for each given segment of the lexical unit, its context;

training the server to calculate a theoretical frequency of at least one second alphabet character representing transcription of a particular given segment based on the context of said particular given segment of the lexical unit, in respect to a plurality of pairs, each pair comprising a lexical unit and a corresponding transcription, and training the server to calculate the theoretical frequency of a transcription of the given segment based on the context of the given segment is training the server using a machine learning algorithm.

In some implementations, the method further comprises: receiving from a client device a request, the request being interpreted as a request to transcript a second lexical unit, written using the first alphabet, into the second alphabet; splitting the second lexical unit into one, selected from: (i) a single vowel segment; (ii) a single consonant segment; (iii) a sequence of sequentially alternating vowel segment and consonant segment; applying the theoretical frequency of the transcription of each segment of the second lexical unit, the theoretical frequency based on the context of each given segment in the second lexical unit, generating the transcription of the second lexical unit into the second alphabet.

In some implementations, the method further comprises sending to the client device instructions to display the transcription of the second lexical unit in the second language to the user.

In some implementations, at least one segment of the lexical unit is an aphthong, and instructions to display transcription of the second lexical unit in the second language to the user comprises instruction to omit displaying a character designated to represent the aphthong.

In some implementations, wherein the receiving from a client device a request to transcript the second lexical unit, written in the first alphabet, into the second alphabet, comprises receiving a search request, the method further comprises conducting a search using transcription of the second lexical unit into the second alphabet as the search request, and generating a search engine result page.

In some implementations, the method further comprises sending to the client device instructions to display the search engine result page.

In yet another aspect, implementations of the present technology provide a server. The server comprises an information storage medium. The server comprises a processor. The processor is coupled to the information storage medium. The processor is configured to have access to computer readable commands which commands, when executed, cause the processor to perform steps of: (i) acquiring a pair of (i) the lexical unit written in the first alphabet, and (ii) the corresponding transcription of the lexical unit written in the second alphabet, the lexical unit and the transcription of the corresponding lexical unit having been divided into respective segments, such that within the pair, every segment of the lexical unit has a corresponding segment in the transcription of the lexical unit, and such that each lexical unit comprises one, selected from: (i) a sequence of sequentially alternating vowel segment and consonant segment, (ii) a single vowel segment, (iii) a single consonant segment; each vowel segment consisting of at least one vowel and each consonant segment consisting of at least one consonant; and (ii) defining, for each given segment of the lexical unit, its context; (iii) training the server to calculate a theoretical frequency of at least one second alphabet character representing transcription of a particular given segment based on the context of said particular given segment of the lexical unit.

In some implementations, the lexical unit is one selected from: a word and a phrase.

In some implementations, the lexical unit comprises at least one special character.

In some implementations, at least one special character in the phrase, located between a consonant and a vowel, before the vowel, is deemed to be one, selected from: a vowel and a consonant, and said at least one special character, if being deemed vowel, makes a part of an adjacent vowel segment, and said at least one special character, if being deemed consonant, makes a part of an adjacent consonant segment.

In some implementations, at least one special character in the phrase, located between a vowel and a consonant, before the consonant, is deemed to be one, selected from: a vowel and a consonant, and said at least one special character, if being deemed vowel, makes a part of an adjacent vowel segment, and said at least one special character, if being deemed consonant, makes a part of an adjacent consonant segment.

In some implementations, at least one special character is deemed to be non-existent.

In some implementations, at least one special character is any one, selected from: a space, a hyphen, a line break, page break, and an apostrophe.

In some implementations, the context of the lexical unit comprises one selected from: a preceding context and a following context.

In some implementations, the preceding context of the given segment is any one, selected from: a preceding adjacent segment of the lexical unit and a preceding end of the lexical unit; and following context of the given segment is any one, selected from: a following adjacent segment of the lexical unit and a following end of the lexical unit.

In some implementations, at least one segment of the lexical unit is an aphthong, and the corresponding transcription of the lexical unit comprises a character designated to represent the aphthong.

In some implementations, the second alphabet comprises one, selected from: (i) an alphabet other than the first alphabet, and (ii) a phonetic alphabet.

In some implementations, the processor is further configured repeat, in respect to a plurality of pairs, each pair comprising a lexical unit and a corresponding transcription, steps of:

acquiring a pair of (i) the lexical unit written in the first alphabet, and (ii) the corresponding transcription of the lexical unit written in the second alphabet, the lexical unit and the transcription of the corresponding lexical unit having been divided into respective segments, such that within the pair, every segment of the lexical unit has a corresponding segment in the transcription of the lexical unit, and such that each lexical unit comprises one, selected from: (i) a sequence of sequentially alternating vowel segment and consonant segment, (ii) a single vowel segment, (iii) a single consonant segment; each vowel segment consisting of at least one vowel and each consonant segment consisting of at least one consonant; and defining, for each given segment of the lexical unit, its context;

training the server to calculate a theoretical frequency of at least one second alphabet character representing transcription of a particular given segment based on the context of said particular given segment of the lexical unit, and training the server to calculate the theoretical frequency of a transcription of the given segment based on the context of the given segment is training the server using a machine learning algorithm.

In some implementations, the processor is further configured to perform: receiving from a client device a request, the request being interpreted as a request to transcript a second lexical unit, written using the first alphabet, into the second alphabet; splitting the second lexical unit into one, selected from: (i) a single vowel segment; (ii) a single consonant segment; (iii) a sequence of sequentially alternating vowel segment and consonant segment; applying the theoretical frequency of the transcription of each segment of the second lexical unit, the theoretical frequency based on the context of each given segment in the second lexical unit, generating the transcription of the second lexical unit into the second alphabet.

In some implementations, the processor is further configured to send to the client device instructions to display the transcription of the second lexical unit in the second language to the user.

In some implementations, at least one segment of the lexical unit is an aphthong, and instructions to display transcription of the second lexical unit in the second language to the user comprises instruction to omit displaying a character designated to represent the aphthong.

In some implementations, wherein the receiving from a client device a request to transcript the second lexical unit, written in the first alphabet, into the second alphabet, comprises receiving a search request, the processor is further configured to conduct a search using transcription of the second lexical unit into the second alphabet as the search request, and generate a search engine result page.

In some implementations, the processor is further configured to send to the client device instructions to display the search engine result page.

In the context of the present specification, unless specifically provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, the expression "information" includes information of any nature or kind whatsoever, comprising information capable of being stored on an information storage medium. Thus information includes, but is not limited to indexes of any kind, databases, arrays of information, files of any kind, audiovisual works (photos, movies, sound records, presentations etc.), data (map data, location data, numerical data, etc.), text (opinions, comments, questions, messages, words and phrases written in any alphabet etc.), documents, spreadsheets, etc.

In the context of the present specification, unless specifically provided otherwise, the word "alphabet" is meant to designate a standard set of characters (basic written symbols or graphemes) which is used to write in a particular language, based on a general principle that the letters represent phonemes (basic significant sounds) of a spoken language. In the context of the present specification, unless specifically provided otherwise, a standard set of characters being used in two or more different languages, shall mean two or more alphabets, even though these sets of letters can be identical. Non-limiting examples of alphabets are the Latin and Latin based alphabets, like English, Italian, German, French, Polish and other alphabets, Cyrillic based alphabets such as Russian alphabet, Bulgarian alphabet, Ukrainian alphabet etc., the Greek and Greek based alphabets, the Armenian alphabet, the Georgian alphabet, the Hangul alphabet, and others. Some alphabets, for example English and Italian, can comprise identical sets of characters. In the context of the present specifications, two alphabets having identical sets of characters are meant to be two distinctive alphabets.

In the context of the present specification, unless specifically provided otherwise, the expression "a phonetic alphabet" is meant to designate an alphabetic system of phonetic notations. It can be devised as a standardized representation of the sounds of a spoken language. Phonetic alphabet symbols are composed of one or more elements of two basic types, letters and diacritics. For example, the sound of the English letter <t> may be transcribed in the phonetic alphabet with a single letter, [t], or with a letter plus diacritics, [t̺], depending on how precise one wishes to be. Often, slashes are used to signal broad or phonemic transcription; thus, /t/ is less specific than, and could refer to, either [t̺] or [t], depending on the context and language. A phonetic alphabet is a type of an alphabet.

In the context of the present specification, unless specifically provided otherwise, the word "lexical unit" is meant to designate a word or a phrase written in a particular alphabet. Lexical unit can comprise letters and special characters, such as a space, a hyphen, a line break, page break, an apostrophe, and other. Some examples of lexical units written using French alphabet are: (a) "à", (b) "bonjour", (c) "qu'est-ce qu'un statut", (d) "vous êtes", (e) "êtes-vous". Some examples of lexical units written using English alphabet are: (a) "a", (b) "statement", (b) "ID", (c) "well-being", (d) "a patent for an invention is the grant of a property right to the inventor".

In the context of the present specification, unless specifically provided otherwise, the word "consonant" is meant to designate an alphabet character representing a speech sound that is articulated with complete or partial closure of the vocal tract. Examples are [p], pronounced with the lips; [t], pronounced with the front of the tongue; [k], pronounced with the back of the tongue; [h], pronounced in the throat;

[f] and [s], pronounced by forcing air through a narrow channel (fricatives); and [m] and [n], which have air flowing through the nose (nasals). Contrasting with consonants are vowels. In the context of the present specification, in some implementations of the present technology, special charters can be deemed to be consonants, despite the fact that they may not represent a speech sound.

In the context of the present specification, unless specifically provided otherwise, the word "vowel" is meant to designate an alphabet character representing a sound in spoken language, pronounced with an open vocal tract so that there is no build-up of air pressure at any point above the glottis. Contrasting with vowels are consonants. In the context of the present specification, in some implementations of the present technology, special charters can be deemed to be vowels, despite the fact that they may not represent a speech sound.

In the context of the present specification, unless specifically provided otherwise, the expression "vowel segment" is meant to designate a segment of a lexical unit consisting of at least one vowel. Vowel segment consists of all vowels in a lexical unit adjoining one another, without being separated by at least one consonant. When a special character is deemed to be a vowel, that special character makes a part of the adjacent vowel segment.

In the context of the present specification, unless specifically provided otherwise, the expression "consonant segment" is meant to designate a segment of a lexical unit consisting of at least one consonant. Consonant segment consists of all consonants in a lexical unit adjoining one another, without being separated by at least one vowel. When a special character is deemed to be a consonant, that special character makes a part of the adjacent consonant segment.

In the context of the present specification, unless specifically provided otherwise, the word "transcription" is meant to include the representation of speech or signing in written form. The source of the transcription can either be utterances (speech or sign language) or pre-existing text in another writing system, including pre-existing text written in another language or written using another alphabet.

In the context of the present specification, unless specifically provided otherwise, the expression "component" is meant to include software (appropriate to a particular hardware context) that is both necessary and sufficient to achieve the specific function(s) being referenced.

In the context of the present specification, unless specifically provided otherwise, the expression "information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first predetermined index" and "third predetermined index" is not intended to imply any particular order, type, chronology, hierarchy or ranking (for example) of/between the predetermined indexes, nor is their use (by itself) intended imply that any "second predetermined index" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
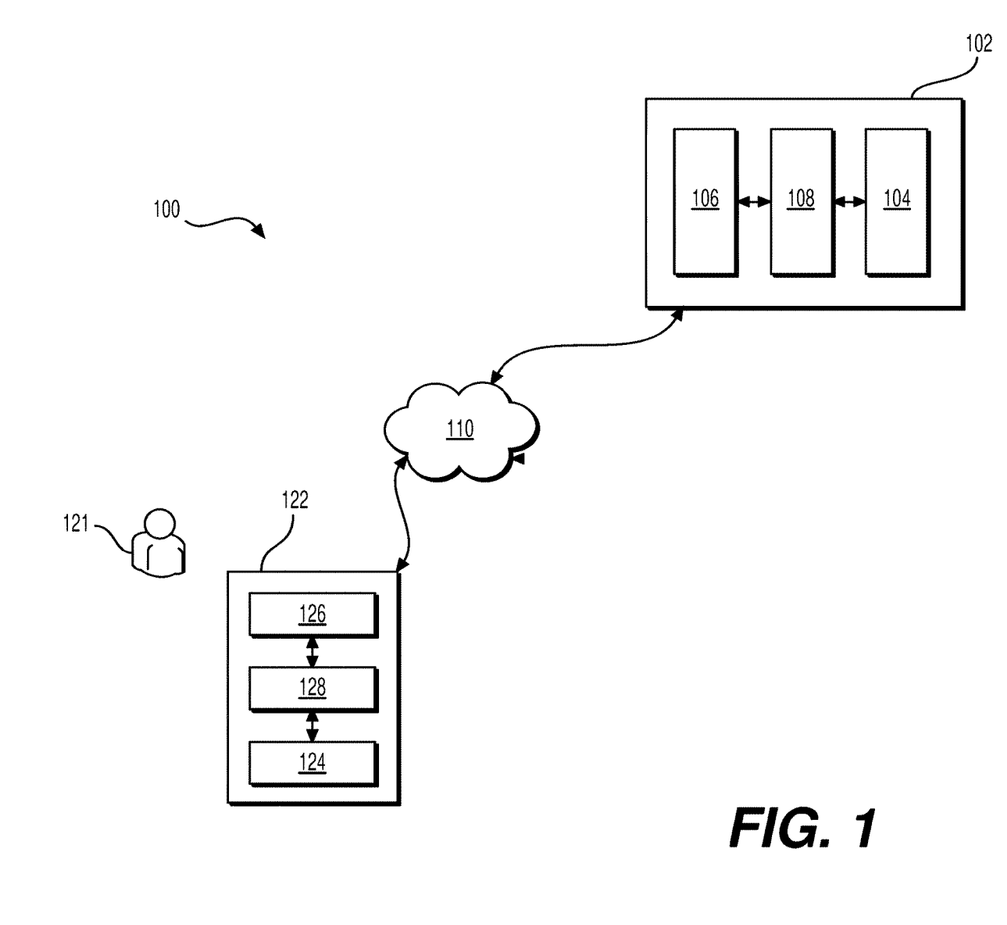
FIG. 1 is a schematic diagram of a system implemented in accordance with an embodiment of the present technology.

Referring to FIG. 1, there is shown a diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

System 100 includes a server 102. The server 102 may be implemented as a conventional computer server. In an example of an embodiment of the present technology, the server 102 may be implemented as a Dell™ PowerEdge™ Server running the Microsoft™ Windows Server™ operating system. Needless to say, the server 102 may be implemented in any other suitable hardware and/or software and/or firmware or a combination thereof. In the depicted non-limiting embodiment of present technology, the server 102 is a single server. In alternative non-limiting embodiments of the present technology, the functionality of the server 102 may be distributed and may be implemented via multiple servers.

The server 102 includes an information storage medium 104 that may be used by the server 102. Generally, the information storage medium 104 may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof. The information storage medium 104 is configured to store information, including computer-readable instructions and other data, including, as a non limiting example, pairs of lexical units written in the first alphabet, and the corresponding transcriptions of these lexical units written in the second alphabet, the lexical units and the transcriptions of the corresponding lexical unit having been divided into respective segments.

The implementations of the server 102 are well known in the art. So, suffice it to state, that the server 102 comprises inter alia a network communication interface 106 (such as a modem, a network card and the like) for two-way communication over a communication network 110; and a processor 108 coupled to the network communication interface 106 and the information storage medium 104, the processor 108 being configured to execute various routines, including those described herein below. To that end the processor 108 may have access to computer readable instructions stored on the information storage medium 104, which instructions, when executed, cause the processor 108 to execute the various routines described herein.

The information storage medium 104 can store database (not depicted) where pairs of lexical units and transcriptions can be stored.

The information storage medium 104 can store computer-readable instructions that, when executed, cause the processor 108 to acquire pairs of lexical units written in the first alphabet, and the corresponding transcriptions of these lexical units written in the second alphabet. The lexical units and the transcriptions of the corresponding lexical unit can be divided into respective segments such that within the pair, every segment of the lexical unit has a corresponding segment in the transcription of the lexical unit, and such that each lexical unit comprises one, selected from: (i) a sequence of sequentially alternating vowel segment and consonant segment, (ii) a single vowel segment, (iii) a single consonant segment. The pairs divided into corresponding segments can be received, for example, from a human operator. Lexical units can be divided into segments by human operator or by any suitable computing device. Corresponding transcriptions can be divided into segments by a human operator.

Figure 2:
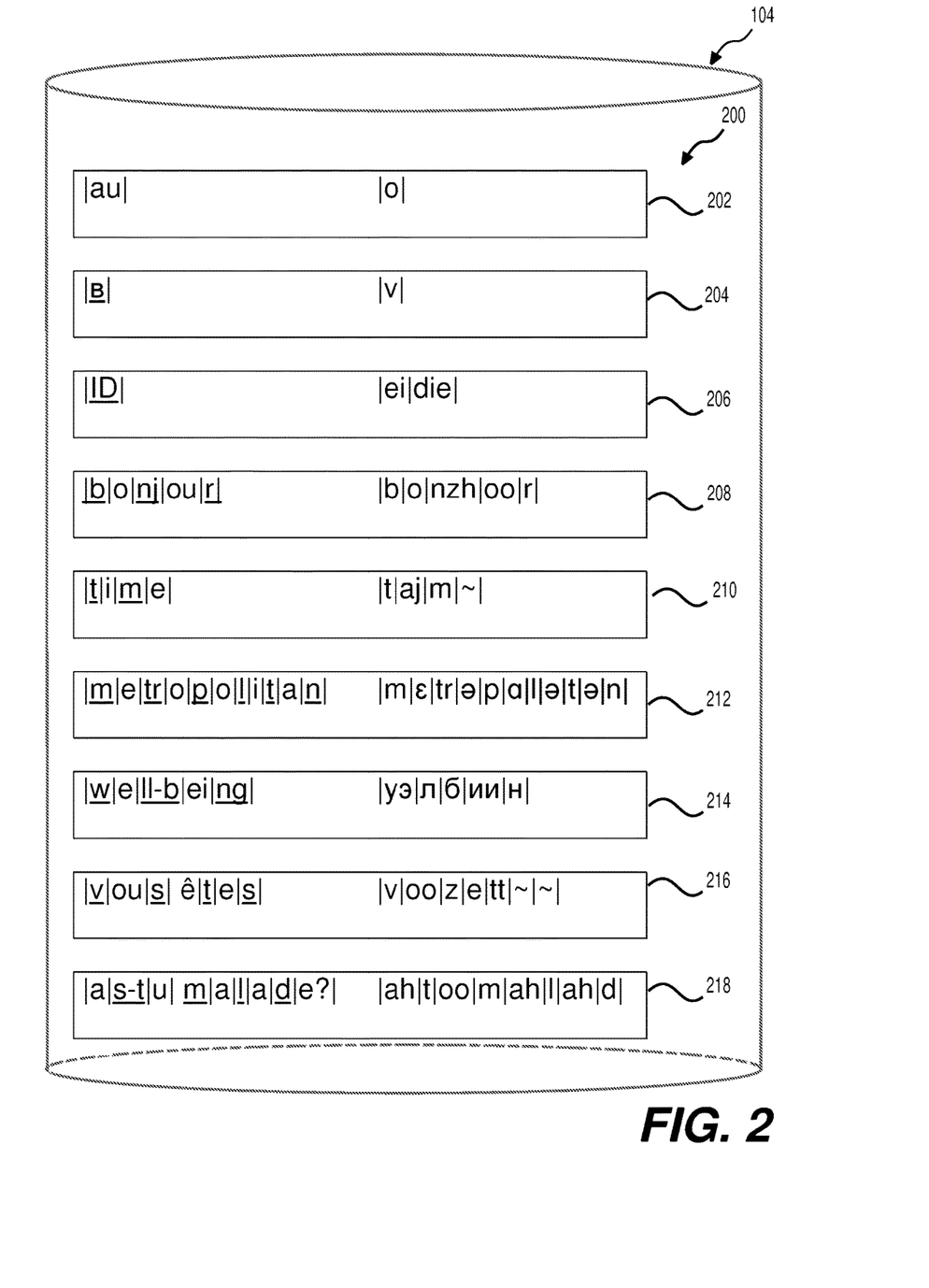
FIG. 2 depicts an information storage medium of the system of FIG. 1, the information storage medium storing various pairs of lexical units written in a first alphabet, and corresponding transcriptions of the lexical units written in a second alphabet, the information storage medium being implemented in accordance with non-limiting embodiments of the present technology.

The processor 108, for example, can acquire a pair, where the lexical unit is written in Russian language using the Cyrillic alphabet, and the transcriptions of the corresponding lexical unit written in English alphabet using English letter combination to communicate the phonetic of the Russian lexical unit: "здравствуйте —zdrahstvooytyeh", having been already divided into respective segments as follows: " 'зд|а|вств|уй|т|е —zdr|ah|stv|oo|yt|yeh". As another example, the processor 108 can acquire a pair, where the lexical unit is written in French language using French alphabet, and the transcriptions of the corresponding lexical unit written in English alphabet using English letter combination to communicate the phonetic of the French lexical unit: "bonjour—bonzhoor", having been divided into respective segments as follows: "b|o|nj|ou|r—b|o|nzh|oo|r". Pairs of lexical units written in the first alphabet, and the corresponding transcriptions of these lexical units written in the second alphabet are depicted in FIG. 2 and described below in more details.

The information storage medium 104 can store computer-readable instructions that, when executed, cause the processor 108 to define, for each given segment of the lexical unit, its context. Segments of lexical units and their context are depicted in FIG. 2 and are described below in more details.

The information storage medium 104 can store computer-readable instructions that, when executed, cause the processor 108 to calculate a theoretical frequency of at least one second alphabet character representing transcription of a particular given segment based on the context of the particular given segment.

For example, information storage medium 104 can store plurality of pairs of French lexical units written in French alphabet, and the corresponding transcriptions of these lexical units written in English alphabet, the lexical units and the transcriptions of the corresponding lexical unit having been divided into respective segments. Let's assume that within these pairs, a particular consonant segment "s" in plurality of lexical units was transcribed, for example, 10,000,000 times. When the consonant segment "s" was situated at an end of a given lexical unit, after a vowel segment, it was transcribed as an aphthong (for example, the last letter "s" in the French masculine proper name "François", which should not to be pronounced). However, when the consonant segment "s" was situated between vowel segments, it was transcribed as "z" (for example, the letter "s" in the French feminine proper name "Françoise"). Thus, it is statistically possible, that a particular segment can be pronounced in only one way in a particular context (the theoretical frequency of possible transcriptions of the segment in the given context is 100 percent). However, it may happen that a particular segment, being in the same context, can be transcribed in two or more different ways. If there are two or more different ways to pronounce the same segment in the very same context (but often in different lexical units), the processor 108 can calculate the theoretical frequency of each of possible transcriptions of the segment in the given context, each of theoretical frequencies being less than 100 percent, and the sum of theoretical frequencies would be 100 percent.

The processor 108 can calculate a theoretical frequency of at least one second alphabet character representing transcription of a particular given segment based on the context of said particular given segment, when the processor 108 has access to at least one pair of a lexical unit written in the first alphabet, and a corresponding transcription of the lexical unit. However, if the processor 108 has access to a plurality of pairs, the theoretical frequency of at least one second alphabet character representing transcription of a particular given segment based on the context can be more accurate.

The information storage medium 104 can store computer-readable instructions that, when executed, cause the processor 108 to receive from a client device 122, which will be described in more details below, lexical units written using the first alphabet, the first alphabet being non-native for these lexical units. As a non-limiting example, the client device 122 is a personal computer in an Internet-cafe in the airport Schoenefeld in Germany, where Russian keyboard is not installed. A user 121 writes, using a web-interface of his e-mail service provider, on client device 122, an e-mail in Russian language, but using letters of German alphabet, since there is no Russian keyboard. The user 121 activates, in the web-interface of his e-mail service provider, an option "transcript". The client device 122 can send, over a communications network 110, the text as it is written, along with a request to transcribe the text, and the processor 108 of the server 102 can receive the text to be transcribed. As another non-limiting example, the user 121 types in Russian language, but using an English alphabet, a search request in a search bar of a web browser. Client device 122 sends the search request, as the user 121 is typing it, to the server 102.

The information storage medium 104 can store computer-readable instructions that, when executed, cause the processor 108 to split received lexical units. Each lexical unit can be split either into a single vowel segment, or into a single consonant segment, or into a sequence of sequentially alternating vowel segment and consonant segment. For example, if received lexical unit is a French word "eau" comprising vowels only, this lexical unit will be split into a single vowel segment |eau|. If received lexical unit is a Russian preposition "в" comprising one consonants only, this lexical units will be split into a singe consonant segment |в|. If received lexical unit is a German noun "Bundesverfassungsgericht" comprising both vowels and consonants, this lexical units will be split into a sequence of sequentially alternating vowel segment and consonant segment: |B|u|nd|e|sv|e|rf|a|ss|u|ngsg|e|r|i|cht|.

The information storage medium 104 can store computer-readable instructions that, when executed, cause the processor 108 to apply the theoretical frequency of the transcription of each segment of the second lexical unit, the theoretical frequency based on the context of each given segment in the second lexical unit, and to generate the transcription of the second lexical unit into the second alphabet. In other words, the processor 108 can, after splitting the received lexical unit into segments, determine context for each of these segments, to retrieve statistics applicable to each segment comprising in the received word, substitute each segment in the received lexical unit with the most suitable transcription, according to the theoretical frequency of the transcription of that particular segment being in the same context.

The information storage medium 104 can store computer-readable instructions that, when executed, cause the processor 108 to send to the client device 122 instructions to display the transcription of the second lexical unit in the second language to the user 121. The computer-readable instructions can further cause the processor 108 to send to the client device 122 instructions to omit displaying a character designated to represent the aphthong. Thus, the aphthong character can be a virtual character, existing additionally to any alphabet, which is considered in the process of transcription, but which would not be displayed to the user 121.

The information storage medium 104 can store computer-readable instructions that, when executed, cause the processor 108, responsive to receiving a search request, to transcribe the search request into another alphabet and then to conduct a search using transcription as a search request. This function can be used, for example, when the user 121 types a search request using an Alphabet which is not native for a particular language (for example, if he or she writes English words using Russian alphabet).

System 100 further includes the client device 122. The client device 122 can be associated with the user 121. The user 121 can perform actions which can be interpreted by the client device 122 as the request for the executing the action. It should be noted that the fact that the client device 122 can be associated with the user 121 does not need to suggest or imply any specific mode of operation.

Depicted in FIG. 1 the client device 122 is implemented as Dell™ Precision T1700 MT CA033PT170011RUWS PC with Intel® Xeon™ processor 128, CPU frequency 3300 MHz, video card nVIDIA Quadro K2000, running the Windows 7® Pro 64-bit operating system, the operating system installed and active. The client device 122 comprises inter alia a network communication interface 126 (such as a modem, a network card and the like) for two-way communication over a communication network 110. As those skilled in the art will understand, the implementation of the client device 122 is not particularly limited. The client device 122 may be implemented as a personal computer (desktops, laptops, netbooks, etc.), a wireless communication device (a cell phone, a smartphone, a tablet and the like), as well as other equipment.

The client device 122 comprises a user input device (not depicted). How the user input device is implemented is not particularly limited and may depend on how the client device 122 is implemented. The user input device may include any mechanism for providing user input to the processor 128. The user input device can be a keyboard, or a mouse, and so on. The input device is not limited to any specific input methodology, but could be arranged by a virtual button on a touch-screen display or a physical button on the cover of the electronic device, for instance.

Merely as an example and not as a limitation, in those embodiments of the present technology where the client device 122 is implemented as a wireless communication device (such as a smartphone), user input device can be implemented as an optical interference based user input device. The user input device of one example is a finger/object movement sensing device on which a user performs a gesture and/or presses with a finger. The user input device can identify/track the gesture and/or determines a location of a user's finger on the user input device. In the instances where the user input device is executed as the optical interference based user input device, such as touch screen, or multi-touch display, the user input device can further execute functions of the display screen (not depicted).

The user input device is communicatively coupled to a processor 128 and transmits input signals (and output signals where it also operates as the display screen) based on various forms of user input for processing and analysis by processor 128.

The client device 122 further comprises the display screen (not depicted). The display screen can be implemented as a 21.5" Dell™ E2214H 2214-7803, 1920×1080 screen resolution. The display screen is generally configured to display a graphical user interface (GUI) that provides an easy to use visual interface between the user 121 of the client device 122 and the operating system or application(s) running on the client device 122. Generally, the GUI presents programs, files and operational options with graphical images. The GUI enables the user 121 making the request for executing the action, for example, to make search requests by entering the search request into a search bar of a graphical user interface of a web browser. The request can be made, for example, via the input device, by taping a search request using any alphabet.

Display screen is also generally configured to display other information like user data and web resources, such as maps with a text written in any alphabet.

In alternative implementations of the present technology, the display screen can be liquid crystal display (LCD), light emitting diode (LED), interferometric modulator display (IMOD), or any other suitable display technology. Display screen can also be touch based devices such as touch screen. A touch screen is a display that detects the presence and location of user touch inputs. Display screen can also be dual touch or multi-touch displays that can identify the presence, location and movement of a touch inputs. In the instances where the display screen is implemented as a touch based device such as touch screen, or multi-touch display, the display screen can execute functions of the user input device.

The display screen is communicatively coupled to processor 128 and receives signals from the processor 128. In instances where display screen is implemented as a touch based device such as touch screen, or multi-touch display, the display screen can also transmit input signals based on various forms of user input for processing and analysis by processor 128.

The client device 122 further includes an information storage medium 124 being implemented as a 500 Gb hard drive, and as 8 GB (2×4 GB) 1600 MHz DDR3 Non-ECC. As those skilled in the art will understand, the information storage medium 124 can be implemented as information storage medium of any nature and kind whatsoever, including RAM, ROM, disks (CD-ROMs, DVDs, floppy disks, hard drivers, etc.), USB keys, solid state-drives, tape drives, etc. and combination thereof. The information storage medium 124 is configured to store information, including computer-readable instructions and other data.

The information storage medium 124 can store program instructions which implements software which execute functions of a web browser (not depicted). Generally, the purpose of the web browser is to enable the user 121 to connect to the server 102, and request various services, such as map search using map services, general or vertical searches in the Internet using various search engines, e-mail services, translation services, and others. In the client device 122 the browser is implemented as a mobile version of Yandex™ browser. However, as those skilled in the art will understand, the implementation of the browser is not particularly limited. As non-limiting examples such browsers can be Yandex™ browser, Google Chrome™ browser, Internet Explorer™ browser, various mobile search applications and the like. It should be expressly understood that any other commercially available or proprietary application may be used for implementing non-limiting embodiments of the present technology.

FIG. 2 illustrates non-limiting examples of pairs 200 of lexical units written in a first alphabet (the left column), and corresponding transcriptions (the right column) of the lexical units written in a second alphabet. The lexical units and the transcriptions of the corresponding lexical units are divided into respective segments such that within a pair, every segment of a lexical unit has a corresponding segment in the transcription of the lexical unit, and such that each lexical unit comprises either a sequence of sequentially alternating vowel segment and consonant segment, or a single vowel segment, or a single consonant segment. Segments of a transcription can be either vowel segments, or consonant segments, or mixed segments.

Pair 202 is an illustration of a lexical unit written in a first alphabet, and corresponding transcription of the lexical unit written in a second alphabet, wherein the lexical unit "au" is written in French alphabet, and the corresponding transcription "o" is written in English alphabet. The lexical unit "au" is a single French word. In other implementations, a lexical unit being a single word can be any part of speech, for example, a noun, a verb, an adjective and others. The lexical unit "au" and the corresponding transcription "o" are divided into the same number of respective segments (one segment in the lexical unit and one corresponding segment in the transcription) such that within the pair, the sole segment of the lexical unit has the sole corresponding segment in the transcription of the lexical unit, and such that the lexical unit "au" comprises a single vowel segment |au|. In this example, both the first alphabet (English alphabet) and the second alphabet (French alphabet) are Latin based alphabets.

Pair 204 is an illustration of a lexical unit written in a first alphabet, and corresponding transcription of the lexical unit written in a second alphabet, wherein the lexical unit "в" is written using Russian alphabet, and the corresponding transcription "v" is written using English alphabet. The lexical unit "в" is a single word being a Russian preposition. The lexical unit "в" and the corresponding transcription "v" are divided into the same number of respective segments (one segment in the lexical unit and one segment in the transcription) such that within the pair, the sole segment of the lexical unit has the sole corresponding segment in the transcription of the lexical unit, and such that the lexical unit "в" comprises a single consonant segment |v|. Pair 206 is an illustration of a lexical unit written in a first alphabet, and corresponding transcription of the lexical unit written in a second alphabet, wherein the lexical unit "ID" is written in English alphabet, and the corresponding transcription "|ei|die|" is written in German alphabet. The lexical unit "ID" is a single English word (abbreviation). The lexical unit "ID" and the corresponding transcription "eidie" are divided into the same number of respective segments (two segments in the lexical unit and two corresponding segments in the transcription) such that within the pair, two segments of the lexical unit has two corresponding segments in the transcription of the lexical unit. In this example, both the first alphabet (English alphabet) and the second alphabet (German alphabet) are Latin based alphabets.

Pair 208 is an illustration of a lexical unit written in a first alphabet, and corresponding transcription of the lexical unit written in a second alphabet, wherein the lexical unit "bonjour" is written using French alphabet, and the corresponding transcription "bonzhoor" is written using English alphabet. The lexical unit "bonjour" is a single word. The lexical unit "bonjour" and the corresponding transcription "bonzhoor" are divided into the same number of respective segments (five segments in the lexical unit and five corresponding segments in the transcription) such that within the pair, each segment of the lexical unit has the corresponding segment in the transcription of the lexical unit, and such that the lexical unit "bonjour" comprises a sequence of sequentially alternating consonant segments and vowel segments. For illustrative purposes, in FIG. 2, all consonant segments in the lexical unit "bonjour", as well as in all other lexical units, are underlined. All vowel segments in the lexical unit "bonjour", as well as in all other lexical units, are not underlined.

Pair 210 is an illustration of the lexical unit "time" being written using English alphabet, and the corresponding transcription "tajm~" being written using German alphabet. The lexical unit "|t|i|m|e|" and the corresponding transcription "|t|aj|m|~|" are divided into the same number of respective segments (four segments in the lexical unit and four corresponding segments in the transcription) such that within the pair, each segment of the lexical unit has the corresponding segment in the transcription of the lexical unit, and such that the lexical unit "time" comprises a sequence of sequentially alternating consonant segments and vowel segments. The last letter "e" in the English word "time" is a vowel being an aphthong. This vowel being the aphthong corresponds to the segment in the transcription depicted as |~|. The character "~" is designated to represent an aphthong in some implementations of the present technology. It should be noted, that the choice of the character "~" as a character designated to represent the aphthong is fortuitous. Any other suitable sign can be used instead.

Transcriptions can be shown to the user 121 on the display screen of his or her client device 122. Accordingly, the server 102 can send to the client device 122 instructions to display a transcription of a lexical unit in a second language to the user 121. These instructions can comprise instruction to omit displaying a character designated to represent an aphthong. Thus, the German transcription of the English word "time" can be shown to the user 121 as "tajm" without displaying the character "~", designated to represent an aphthong.

Pair 212 is an example where an English word "metropolitan" is transcribed into the International Phonetic Alphabet (IPA), IPI being one of existent phonetic alphabets.

Pair 214 is an illustration of the lexical unit "well-being" being written in English alphabet, and the corresponding transcription "уэлбиин" being written in Russian alphabet. The lexical unit "well-being" and the corresponding transcription "уэлбиин" are divided into the same number of respective segments (five segments in the lexical unit and five corresponding segments in the transcription) such that within the pair, each segment of the lexical unit has the corresponding segment in the transcription of the lexical unit, and such that the lexical unit "well-being" comprises a sequence of sequentially alternating consonant segments and vowel segments. There is a special character (hyphen) inside the word "well-being". In this implementation, the special character being a hyphen is deemed to be non-existent. Thus, the splitting the lexical unit is performed as though there were no hyphen in the word "well-being".

The rules with regard to some special characters can be pre-programmed and stored on the information storage medium 104. These rules can be language-specific. For example, there can be a rule that a hyphen should be deemed non-existent in English language, if letters being non-special-characters are adjacent from the both sides to that hyphen. As another example, in French language, the hyphen may be deemed vowel, if immediately following letter is vowel, and it may be deemed consonant, if immediately following letter is consonant. This will be illustrated below, when describing pair 218 below.

Pair 216 is an illustration of the lexical unit "vous êtes" being written using French alphabet, and the corresponding transcription "voozett" being written using English alphabet. The lexical unit "vous êtes" is a phrase consisting of two words. In other implementations, phrases can comprise several words, a sentence, several sentences, a paragraph, several paragraphs. The lexical unit "vous êtes" and the corresponding transcription "voozett" are divided into the same number of respective segments (seven segments in the lexical unit and seven corresponding segments in the transcription) such that within the pair, each segment of the lexical unit has the corresponding segment in the transcription of the lexical unit, and such that the lexical unit "vous êtes" comprises a sequence of sequentially alternating consonant segments and vowel segments. There is a special character (space character) inside the lexical unit "vous êtes". In this implementation, the special character being a space character is deemed to be a vowel, if the first letter in the following word is a vowel, and it is deemed to be consonant, if the first letter in the following word is a consonant.

The reason is that in some languages, for example in French language, pronunciation of the last consonant of a preceding word depends on the first letter of the following word. In such languages, all or some special characters separating words (space characters, hyphens, and others) can be deemed to belong to the same group as the first letter of the following word. The first letter of the following word is vowel and, therefore, the space character is deemed to be vowel. French "s" at the end of a word has to be pronounced as English "z", if the next word starts with a vowel (such as "ê"). On the other hand the same French letter "s" would not be pronounced if it is located at an end of a last word in a sentence, or the following word starts with a consonant. As an example, in the last word "êtes", the last "s" is not pronounced since there is no following vowel.

In languages other than French, different sets of rules can apply in interpretation of special characters. In some languages, affiliation of all or some special characters either with vowels or with consonants can be defined by following letter being a vowel or a consonant, as in French. In other languages, affiliation of all or some special characters can be defined by preceding vowel or consonant. In yet other languages, affiliation of some special characters can be defined by following vowel or consonant, and affiliation of other special characters can be defined by preceding vowel or consonant. In addition to the illustrations provided above, some language-specific rules can provide for that some special characters are deemed non existent.

Pair 218 is an illustration of the lexical unit "as-tu malade?" being written using French alphabet, and the corresponding transcription "ahtoomahlahd" being written using English alphabet. The lexical unit "as-tu malade?" is a phrase consisting of three words, the first two words being separated by a hyphen. The lexical unit "as-tu malade?" and the corresponding transcription "ahtoomahlahd" are divided into the same number of respective segments (nine segments in the lexical unit and nine corresponding segments in the transcription) such that within the pair, each segment of the lexical unit has the corresponding segment in the transcription of the lexical unit, and such that the lexical unit "as-tu malade?" comprises a sequence of sequentially alternating consonant segments and vowel segments. There are three special characters within the lexical unit "as-tu malade?" (a hyphen, a space character, and a question mark). In this implementation, the special characters being a space character and a hyphen are deemed to be associated with vowels or with consonants depending on the first letter of the following word. The question mark, in this implementation, is deemed to be absent. Right after the hyphen, the following letter "t" is a consonant. Therefore, the hyphen is deemed to be consonant. Right after the space character, the following letter "m" is a consonant. Therefore, the space character is deemed to be consonant. The hyphen, being deemed consonant, is located between two other consonants, between "s" and "t". Therefore, "s", "-" and "t" make together a single consonant segment. The space character, being deemed consonant, is located between a vowel and a consonant, between "u" and "t". Therefore, the space character, being consonant, makes a part of the consonant segment "m" together with the consonant "m". The question sign is deemed to be inexistent and is not represented in the corresponding segment in the transcription. The question sign does not make a separate segment of the lexical unit, because it is deemed to be inexistent, and consonants and vowels can make a part of a consonant segment or a vowel segment.

Vowel segments and consonant segments in lexical units have context. Context of a particular segment (consonant segment or vowel segment) is defined by its preceding context and by following context. Preceding context is what is located right before that particular segment. Following context is what is located right after that particular segment.

Preceding context can include a preceding adjacent segment of the lexical unit and a preceding end of the lexical unit. Following context can include a following adjacent segment of the lexical unit and a following end of the lexical unit.

For example, referring to the lexical unit "au" in the pair 202, the preceding context of the vowel segment |au| is the preceding end of this lexical unit, and the following context of the vowel segment |au| is the following end of this lexical unit.

As another example, referring to the lexical unit "bonjour" in the pair 208, the preceding context of the consonant segment |b| is the preceding end of this lexical unit, and the following context of the consonant segment |b| is the following adjacent vowel segment |o|.

Referring to the same lexical unit in the pair 208, the preceding context of the vowel segment |o| is the preceding adjacent consonant segment |b|, and the following context of the vowel segment |o| is the following adjacent consonant segment |nj|.

Referring to the same lexical unit in the pair 208, the preceding context of the consonant segment |r|, is the preceding adjacent vowel segment |ou|, and the following context of the consonant segment |r| is the following end of the lexical unit.

As another example, referring to the lexical unit "vous êtes" in the pair 216, the preceding context of the consonant segment |s| in the first word "vous" is the preceding adjacent vowel segment |ou|, and the following context of the consonant segment |s| is the following adjacent vowel segment |ê|, the adjacent vowel segment |ê| comprising a space character being deemed vowel, and vowel "ê". The following context of the consonant segment |s| in the first word "vous" is not the following end of the lexical unit, because this lexical unit, as it was mentioned above, is a phrase, and the word "vous" is not the last word in this lexical phrase.

Figure 3:
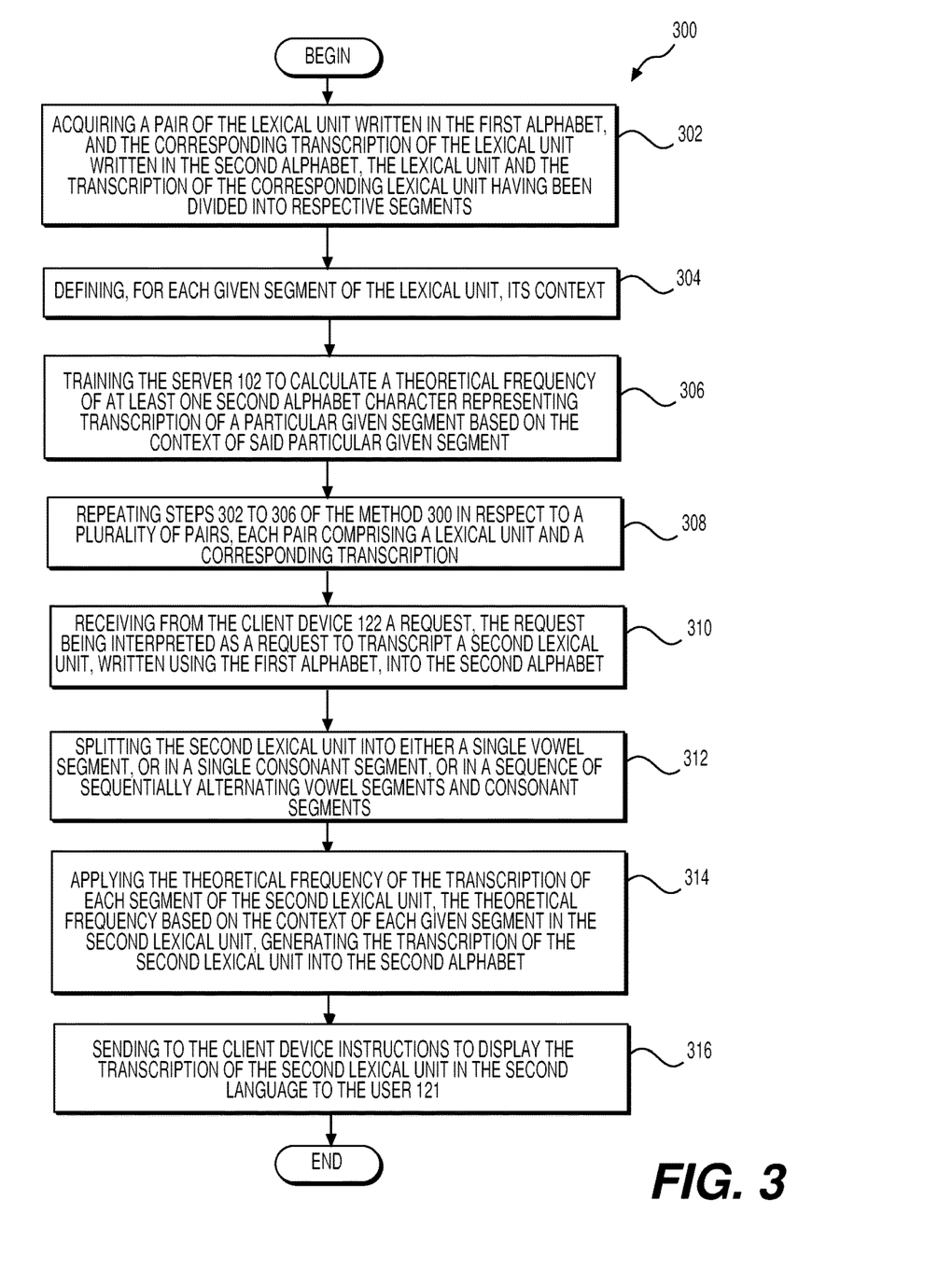
FIG. 3 depicts a block-diagram of a computer-implemented method, the method being implemented in accordance with non-limiting embodiments of the present technology.

FIG. 3 illustrates a computer-implemented method 300 for transcription of a lexical unit from a first alphabet into a second alphabet, the method 300 being implemented in accordance with non-limiting embodiments of the present technology and being executable on the server 102 of the system 100 of FIG. 1.

Step 302—Acquiring a Pair of the Lexical Unit Written in the First Alphabet, and the Corresponding Transcription of the Lexical Unit Written in the Second Alphabet, the Lexical Unit and the Transcription of the Corresponding Lexical Unit Having been Divided into Respective Segments The method 300 starts at step 302, where the server 102 acquires a pair of a lexical unit written in the first alphabet, and the corresponding transcription of the lexical unit written in the second alphabet.

The transcription can be received from any suitable source. For example, the transcription can be prepared by a linguist specializing in the phonetic of the source language (in which the lexical unit is written) and the in the phonetic of destination language (in which language the transcription has to be prepared). For example, to transcribe the lexical unit "vous êtes" into English, a person or a group of people should know phonetic of both languages.

The first alphabet can be the native alphabet for the lexical unit. For example, the native alphabet for the lexical unit "vous êtes" is the French alphabet.

The second alphabet can be the non-native alphabet for the lexical unit. For example, the non-native alphabet for the lexical unit "vous êtes" is the English alphabet.

The lexical unit and the transcription of the corresponding lexical unit are divided into respective segments, as it was described above with references to pair 216 in FIG. 2.

As a non-limiting example of other source of transcriptions, an electronic dictionary can be used if that dictionary contains transcriptions written in phonetic alphabet. Separation of lexical units can be performed automatically or manually. Separation of transcriptions into segments can be performed by linguists.

In alternative implementations, first alphabet can be an non-native alphabet for the lexical unit, and the second alphabet can be native alphabet for the lexical unit. For example, the Russian word "privet" ("hi") can be written using characters of English alphabet, and the transcription can be written using letters of Russian alphabet ("привет").

Then, the method 300 proceeds to the step 304.

Step 304—Defining, for Each Given Segment of the Lexical Unit, its Context

Next, at step 304, the server 102 defines for each given segment of the lexical unit, its context, as it was described above with regard to pairs 200.

Then, the method 300 proceeds to the step 306.

Step 306—Training the Server 102 to Calculate a Theoretical Frequency of at Least One Second Alphabet Character Representing Transcription of a Particular Given Segment Based on the Context of Said Particular Given Segment As a result of division of lexical units and transcriptions into segments, various segments of the transcription can exist. Some segments of the transcription can consist of one second alphabet character (it can be a vowel, or a consonant, or a character designated to represent an aphthong). Some segments of the transcription can consist of two or more second alphabet characters. It can be any combination of vowel(s) and/or consonant(s) and/or character(s) designated to represent an aphthong.

At step 306, the server 102 calculates a theoretical frequency of each segment of the transcription (of at least one second alphabet character representing transcription of a particular given segment of the lexical unit) based on the context of the particular given segment of the lexical unit. It is possible that the theoretical frequency of a particular transcription of a particular lexical unit in the same context will be high, because there a high likelihood that the particular given segment of the lexical unit in the particular context occurs once. For example, for the pair 216 |v|ou|s|ê| t|e|s|—|v|oo|z|e|tt|~|~|, for each element the theoretical frequency will be 100 percent. For example, at this stage:

the consonant "v" being located between the preceding end and a vowel segment "ou", will be represented by segment |v| in 100 percent of cases, i.e., in this single case;

the consonant "s" being located between a vowel "e" and the following end of this lexical unit, will be represented by the aphthong in 100 percent of cases, i.e., in this single case, and so on.

However, the theoretical frequency can be changed after performing step 308 of the method 300.

As a result of performing the step 306, the server 102 can generate initial statistics with regard to transcription of certain vowel and/or consonant segments in a specific context.

Then, the method 300 proceeds to the step 308.

Step 308—Repeating Steps 302 to 306 of the Method 300 in Respect to a Plurality of Pairs, Each Pair Comprising a Lexical Unit and a Corresponding Transcription Next, at step 308, the server 102 repeats steps 302 to 306 of the method 300 in respect to a plurality of pairs, each pair comprising a lexical unit and a corresponding transcription. All lexical units are written in the same first alphabet, and all transcriptions are written in the same second alphabet.

When repeating step 306 with large number of pairs, it can happen that the server 102 will encounter in different lexical units some vowel segments and/or consonant segments, being in the same context. It is possible, that at least some vowel segments and/or consonant segments, being in the same context, are always transcribed in the same way. It means that the theoretical frequency of at least one second alphabet character representing transcription of a particular given segment equal to 100 percent. However, it is also possible, that at least some vowel segments and/or consonant segments, being placed into the same context, are sometimes transcribed in two or more different ways. In this situation, the server 102 can calculate the theoretical frequency of at least one second alphabet character, representing transcription of a particular given segment, the theoretical frequency being other than 100 percent for each of different ways of transcription. The sum of theoretical frequencies can be 100 percent.

Then, the method 300 proceeds to the step 310.

Step 310—Receiving from the Client Device 122 a Request, the Request being Interpreted as a Request to Transcript a Second Lexical Unit, Written Using the First Alphabet, into the Second Alphabet Next, at step 310, the server 102 receives from the client device a request, the request being interpreted as a request to transcript a second lexical unit, written using the first alphabet, into the second alphabet. For example, it can be a request to a server based application which intended to transcript lexical units. Such application can be implemented, for example, as a plug in to an e-mail service.

In alternative implementations, where the first language is a language being non-native for particular lexical unit, and the second language is the native language for the lexical unit, the request can be a request to display a map of Moscow, Russia, wherein the language of the operation system and of the web browser, installed on the client device is English, and where user location is in Australia. Such a request can be interpreted by the server 102 as a request to transcribe names of streets in characters of English alphabet.

In alternative implementations, where the first language is a language being non-native for particular lexical unit, and the second language is the native language for the lexical unit, the request can be a search request, where Russian words were written using characters of English alphabet. Such a request can be interpreted by the server 102 as a request to transcribe the search request into characters of Russian alphabet to be able to conduct a search using the Russian transcription, or both original text and the Russian transcription.

Then, the method 300 proceeds to the step 312.

Step 312—Splitting the Second Lexical Unit into Either a Single Vowel Segment, or in a Single Consonant Segment, or in a Sequence of Sequentially Alternating Vowel Segments and Consonant Segments Next, at step 312, the server 102 splits the received second lexical unit into a single vowel segment, or in a single consonant segment, or in a sequence of sequentially alternating vowel segments and consonant segments.

The second lexical unit can be received within a text which can comprise one word or plurality of words. If the text comprises two or more second lexical units, the step 312 can be performed with regard to each second lexical unit. Depending on the language of the text, each of text words can be treated as a separate second lexical unit, or combinations of words (such as sentences) can be treated as second lexical units being phrases. The choice can depend on language specific rules being stored on the information storage medium 104. Single words can be chosen for languages where pronunciation of segments depends on context within the same word and does not depend on preceding and following words. In other languages, sentences or other group of words can be considered to be a lexical unit.

The processor 108 splits the second lexical unit, as it was described with regard to pairs 200, depicted in FIG. 2.

Then, the method 300 proceeds to the step 314.

Step 314—Applying the Theoretical Frequency of the Transcription of Each Segment of the Second Lexical Unit, the Theoretical Frequency Based on the Context of Each Given Segment in the Second Lexical Unit, Generating the Transcription of the Second Lexical Unit into the Second Alphabet Next, at step 314, the server 102 applies the theoretical frequency of the transcription of each segment of the second lexical unit, the theoretical frequency based on the context of each given segment in the second lexical unit, and generates the transcription of the second lexical unit into the second alphabet. If a particular segment in the second lexical unit, being in a specific content, was previously always transcribed in the same way, according to statistics (see the step 308), it will be transcribed in the same way while executing step 314. However, if the same segment being in the same context was transcribed using one transcription in 80 percent of cases, another transcription in 17 percent of cases, and a third transcription in 3 percent of cases, that segment can be transcribed using the first transcription, as it is statistically more likely to the most accurate transcription.

While executing the step 314, the server 102 can generate the transcription of all lexical segments of the received text.

Then, the method 300 proceeds to the step 316.

Step 316—Sending to the Client Device Instructions to Display the Transcription of the Second Lexical Unit in the Second Language to the User 121

Next, at step 316, after transcription of the second lexical unit is performed, the server 102 sends to the client device 122 instructions to display the transcription of the second lexical unit in the second language to the user 121. The instructions to display the transcription of the second lexical unit in the second language to the user 121 can comprise the instruction to not display characters representing aphthongs.

The method 300 then ends.

From a certain perspective, embodiments of the present technology can be summarized as follows, structured in numbered clauses:

1. A method for transcription of a lexical unit from a first alphabet into a second alphabet, the method executable at a server (102), the method comprising:
acquiring (302) a pair of (i) the lexical unit written in the first alphabet, and (ii) the corresponding transcription of the lexical unit written in the second alphabet, the lexical unit and the transcription of the corresponding lexical unit having been divided into respective segments, such that
within the pair, every segment of the lexical unit has a corresponding segment in the transcription of the lexical unit, and such that
each lexical unit comprises one, selected from: (i) a sequence of sequentially alternating vowel segment and consonant segment, (ii) a single vowel segment, (iii) a single consonant segment; each vowel segment consisting of at least one vowel and each consonant segment consisting of at least one consonant; and
defining (304), for each given segment of the lexical unit, its context;
training (306) the server (102) to calculate a theoretical frequency of at least one second alphabet character representing transcription of a particular given segment based on the context of said particular given segment of the lexical unit.

2. The method of clause 1, wherein the lexical unit is one selected from: a word and a phrase.

3. The method of any one of clauses 1 to 2, wherein the lexical unit comprises at least one special character.

4. The method of clause 3, wherein
at least one special character in the phrase, located between a consonant and a vowel, before the vowel, is deemed to be one, selected from: a vowel and a consonant, and wherein said at least one special character, if being deemed vowel, makes a part of an adjacent vowel segment, and wherein said at least one special character, if being deemed consonant, makes a part of an adjacent consonant segment.

5. The method of clause 3, wherein
at least one special character in the phrase, located between a vowel and a consonant, before the consonant, is deemed to be one, selected from: a vowel and a consonant, and wherein said at least one special character, if being deemed vowel, makes a part of an adjacent vowel segment, and wherein said at least one special character, if being deemed consonant, makes a part of an adjacent consonant segment.

6. The method of any one of clauses 3 to 5, wherein at least one special character is deemed to be non-existent.

7. The method of any one of clauses 3 to 6, wherein at least one special character is any one, selected from: a space, a hyphen, a line break, page break, and an apostrophe.

8. The method of any one of clauses 1 to 7, wherein the context of the lexical unit comprises one selected from: a preceding context and a following context.

9. The method of clause 8, wherein
the preceding context of the given segment is any one, selected from: a preceding adjacent segment of the lexical unit and a preceding end of the lexical unit; and
following context of the given segment is any one, selected from: a following adjacent segment of the lexical unit and a following end of the lexical unit.

10. The method of any one of clauses 1 to 9, wherein at least one segment of the lexical unit is an aphthong, and the corresponding transcription of the lexical unit comprises a character designated to represent the aphthong.

11. The method of any one of clauses 1 to 10, wherein the second alphabet comprises one, selected from: (i) an alphabet other than the first alphabet, and (ii) a phonetic alphabet.

12. The method of any one of clauses 1 to 11, further comprising repeating (308) the method of clause 1 in respect to a plurality of pairs, each pair comprising a lexical unit and a corresponding transcription, and wherein training (306) the server (102) to calculate the theoretical frequency of a transcription of the given segment based on the context of the given segment is training the server (102) using a machine learning algorithm.

13. The method of any one of clauses 1 to 12, further comprising:
receiving (310) from a client device a request, the request being interpreted as a request to transcript a second lexical unit, written using the first alphabet, into the second alphabet,
splitting (312) the second lexical unit into one, selected from:
(i) a single vowel segment;
(ii) a single consonant segment;
(iii) a sequence of sequentially alternating vowel segment and consonant segment;
applying (314) the theoretical frequency of the transcription of each segment of the second lexical unit, the theoretical frequency based on the context of each given segment in the second lexical unit, generating the transcription of the second lexical unit into the second alphabet.

14. The method of clause 13, further comprising sending (316) to the client device instructions to display the transcription of the second lexical unit in the second language to the user (121).

15. The method of clause 14, wherein at least one segment of the lexical unit is an aphthong, and wherein instructions to display transcription of the second lexical unit in the second language to the user (121) comprises instruction to omit displaying a character designated to represent the aphthong.

16. The method of clause 13, wherein the receiving (310) from a client device a request to transcript the second lexical unit, written in the first alphabet, into the second alphabet, comprises receiving a search request, the method further comprising conducting a search using transcription of the second lexical unit into the second alphabet as the search request, and generating a search engine result page.

17. The method of clause 16, further comprising sending to the client device instructions to display the search engine result page.

18. The server (102) having an information storage medium (104), and a processor (108) coupled to the information storage medium (104), the processor (108) being configured to have access to computer readable commands which commands, when executed, cause the processor (108) to perform steps of:
acquiring (302) a pair of (i) the lexical unit written in the first alphabet, and (ii) the corresponding transcription of the lexical unit written in the second alphabet, the lexical unit and the transcription of the corresponding lexical unit having been divided into respective segments, such that
within the pair, every segment of the lexical unit has a corresponding segment in the transcription of the lexical unit, and such that
each lexical unit comprises one, selected from: (i) a sequence of sequentially alternating vowel segment and consonant segment, (ii) a single vowel segment, (iii) a single consonant segment; each vowel segment consisting of at least one vowel and each consonant segment consisting of at least one consonant; and defining (304), for each given segment of the lexical unit, its context;

training (306) the server (102) to calculate a theoretical frequency of at least one second alphabet character representing transcription of a particular given segment based on the context of said particular given segment of the lexical unit.

19. The server (102) of clause 18, wherein the lexical unit is one selected from: a word and a phrase.

20. The server (102) of any one clauses 18 to 19, wherein the lexical unit comprises at least one special character.

21. The server (102) of clause 20, wherein
at least one special character in the phrase, located between a consonant and a vowel, before the vowel, is deemed to be one, selected from: a vowel and a consonant, and wherein said at least one special character, if being deemed vowel, makes a part of an adjacent vowel segment, and wherein said at least one special character, if being deemed consonant, makes a part of an adjacent consonant segment.

22. The server (102) of clause 20, wherein
at least one special character in the phrase, located between a vowel and a consonant, before the consonant, is deemed to be one, selected from: a vowel and a consonant, and wherein said at least one special character, if being deemed vowel, makes a part of an adjacent vowel segment, and wherein said at least one special character, if being deemed consonant, makes a part of an adjacent consonant segment.

23. The server (102) of any one of clauses 20 to 22, wherein at least one special character is deemed to be non-existent.

24. The server (102) of any one of clauses 20 to 23, wherein at least one special character is any one, selected from: a space, a hyphen, a line break, page break, and an apostrophe.

25. The server (102) of any one of clauses 18 to 24, wherein the context of the lexical unit comprises one selected from: a preceding context and a following context.

26. The server (102) of clause 25, wherein
the preceding context of the given segment is any one, selected from: a preceding adjacent segment of the lexical unit and a preceding end of the lexical unit; and
following context of the given segment is any one, selected from: a following adjacent segment of the lexical unit and a following end of the lexical unit.

27. The server (102) of any one of clauses 18 to 26, wherein at least one segment of the lexical unit is an aphthong, and the corresponding transcription of the lexical unit comprises a character designated to represent the aphthong.

28. The server (102) of any one of clauses 18 to 27, wherein the second alphabet comprises one, selected from: (i) an alphabet other than the first alphabet, and (ii) a phonetic alphabet.

29. The server (102) of any one of clauses 18 to 28, wherein the processor (108) is further configured repeat (308) steps of clause 18 in respect to a plurality of pairs, each pair comprising a lexical unit and a corresponding transcription, and wherein training (306) the server (102) to calculate the theoretical frequency of a transcription of the given segment based on the context of the given segment is training the server (102) using a machine learning algorithm 30. The server (102) of any one of clauses 18 to 29, wherein the processor (108) is further configured to perform:

receiving (310) from a client device a request, the request being interpreted as a request to transcript a second lexical unit, written using the first alphabet, into the second alphabet, splitting (312) the second lexical unit into one, selected from:
(i) a single vowel segment;
(ii) a single consonant segment;
(iii) a sequence of sequentially alternating vowel segment and consonant segment;

applying the theoretical frequency (314) of the transcription of each segment of the second lexical unit, the theoretical frequency based on the context of each given segment in the second lexical unit, generating the transcription of the second lexical unit into the second alphabet.

31. The server (102) of clause 30, wherein the processor (108) is further configured to send (316) to the client device instructions to display the transcription of the second lexical unit in the second language to the user (121).

32. The server (102) of clause 31, wherein at least one segment of the lexical unit is an aphthong, and wherein instructions to display transcription of the second lexical unit in the second language to the user (121) comprises instruction to omit displaying a character designated to represent the aphthong.

33. The server (102) of clause 30, wherein the receiving (310) from a client device a request to transcript the second lexical unit, written in the first alphabet, into the second alphabet, comprises receiving a search request, the processor (108) is further configured to conduct a search using transcription of the second lexical unit into the second alphabet as the search request, and generate a search engine result page.

34. The server (102) of clause 33, wherein the processor (108) is further configured to perform sending to the client device instructions to display the search engine result page.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for transcription of a lexical unit from a first alphabet into a second alphabet, the method executable at a server, the server being connected to a client device over a communication network, the server executing a machine learning algorithm (MLA), the method comprising:

acquiring, by the MLA, a pair of (i) the lexical unit in the first alphabet, and (ii) the corresponding transcription of the lexical unit in the second alphabet, the lexical unit and the corresponding transcription of the lexical unit having been divided into respective segments, such that:

within the pair, every segment of the lexical unit has a corresponding segment in the corresponding transcription of the lexical unit; and each lexical unit comprises one of:
(i) a sequence of sequentially alternating vowel and consonant segments,
(ii) a single vowel segment,
(iii) a single consonant segment;
each vowel segment consisting of at least one vowel and each consonant segment consisting of at least one consonant;
defining, by the MLA, for each given segment of the lexical unit, its context;
training the MLA to calculate a theoretical frequency of at least one second alphabet character representing transcription of a particular given segment based on the context of said particular given segment of the lexical unit;
repeating the acquiring, the defining and the training with respect to a plurality of pairs, each respective pair comprising a respective lexical unit and a respective corresponding transcription;
receiving, from the client device, a request to transcribe a second lexical unit, from the first alphabet, into the second alphabet;
splitting the second lexical unit into one of:
(i) a single vowel segment,
(ii) a single consonant segment,
(iii) a sequence of sequentially alternating vowel and consonant segments;
applying, by the MLA, the theoretical frequency of the transcription of each segment of the second lexical unit, the theoretical frequency based on the context of each given segment in the second lexical unit;
generating, by the MLA, the transcription of the second lexical unit into the second alphabet; and
sending, to the client device, instructions to display on a display screen of the client device the transcription of the second lexical unit in the second alphabet to the user.

2. The method of claim 1, wherein the lexical unit is one selected from: a word and a phrase.

3. The method of claim 1, wherein the lexical unit comprises at least one special character.

4. The method of claim 3, wherein
at least one special character in the phrase, located between a consonant and a vowel, before the vowel, is deemed to be one of: a vowel, and a consonant; and wherein
said at least one special character, if being deemed vowel, makes a part of an adjacent vowel segment; and wherein
said at least one special character, if being deemed consonant, makes a part of an adjacent consonant segment.

5. The method of claim 3, wherein
at least one special character in the phrase, located between a vowel and a consonant, before the consonant, is deemed to be one, selected from: a vowel and a consonant; and wherein
said at least one special character, if being deemed vowel, makes a part of an adjacent vowel segment; and wherein
said at least one special character, if being deemed consonant, makes a part of an adjacent consonant segment.

6. The method of claim 3, wherein at least one special character is deemed to be non-existent.

7. The method of claim 3, wherein at least one special character is any one, selected from: a space, a hyphen, a line break, page break, and an apostrophe.

8. The method of claim 1, wherein the context of the lexical unit comprises one selected from: a preceding context and a following context.

9. The method of claim 8, wherein
the preceding context of the given segment is any one, selected from: a preceding adjacent segment of the lexical unit and a preceding end of the lexical unit; and
the following context of the given segment is any one, selected from: a following adjacent segment of the lexical unit and a following end of the lexical unit.

10. The method of claim 1, wherein at least one segment of the lexical unit is an aphthong, and the corresponding transcription of the lexical unit comprises a character designated to represent the aphthong.

11. The method of claim 1, wherein the second alphabet comprises one of: (i) an alphabet other than the first alphabet, and (ii) a phonetic alphabet.

12. The method of claim 1, wherein the receiving from a client device a request to transcribe the second lexical unit, written in the first alphabet, into the second alphabet, comprises receiving a search request, the method further comprising conducting a search using transcription of the second lexical unit into the second alphabet as the search request, and generating a search engine result page.

13. The method of claim 12, further comprising sending to the client device instructions to display the search engine result page.

14. A server for transcribing a lexical unit from a first alphabet into a second alphabet by using a machine learning algorithm (MLA), the server being connected to a client device over a communication network, the server having an information storage medium, and a processor coupled to the information storage medium, the processor being configured to have access to computer readable commands which commands, when executed, cause the processor to perform steps of:
acquiring, by the MLA, a pair of (i) the lexical unit in the first alphabet, and (ii) the corresponding transcription of the lexical unit in the second alphabet, the lexical unit and the corresponding transcription of the lexical unit having been divided into respective segments, such that
within the pair, every segment of the lexical unit has a corresponding segment in the transcription of the lexical unit, and such that
each lexical unit comprises one of: (i) a sequence of sequentially alternating vowel and consonant segments, (ii) a single vowel segment, (iii) a single consonant segment;
each vowel segment consisting of at least one vowel and each consonant segment consisting of at least one consonant; and
defining, by the MLA, for each given segment of the lexical unit, its context;
training the MLA to calculate a theoretical frequency of at least one second alphabet character representing transcription of a particular given segment based on the context of said particular given segment of the lexical unit;
repeating the steps of the acquiring, the defining and the training with respect to a plurality of pairs, each respective pair comprising a respective lexical unit and a respective corresponding transcription;
receiving from the client device a request to transcribe a second lexical unit, from the first alphabet, into the second alphabet;

splitting the second lexical unit into one of:
- (i) a single vowel segment,
- (ii) a single consonant segment,
- (iii) a sequence of sequentially alternating vowel and consonant segments;

applying, by the MLA, the theoretical frequency of the transcription of each segment of the second lexical unit, the theoretical frequency based on the context of each given segment in the second lexical unit;

generating, by the MLA, the transcription of the second lexical unit into the second alphabet; and sending, to the client device, instructions to display on a display screen of the client device the transcription of the second lexical unit in the second alphabet to the user.

15. The server of claim 14, wherein the lexical unit is one selected from: a word and a phrase.

16. The server of claim 14, wherein the lexical unit comprises at least one special character.

17. The server of claim 16, wherein
at least one special character in the phrase, located between a consonant and a vowel, before the vowel, is deemed to be one of: a vowel and a consonant; and wherein
said at least one special character, if being deemed vowel, makes a part of an adjacent vowel segment; and wherein
said at least one special character, if being deemed consonant, makes a part of an adjacent consonant segment.

18. The server of claim 16, wherein
at least one special character in the phrase, located between a vowel and a consonant, before the consonant, is deemed to be one of: a vowel and a consonant; and wherein
said at least one special character, if being deemed vowel, makes a part of an adjacent vowel segment; and wherein
said at least one special character, if being deemed consonant, makes a part of an adjacent consonant segment.

* * * * *